(12) United States Patent
Saito et al.

(10) Patent No.: US 10,647,210 B2
(45) Date of Patent: May 12, 2020

(54) CHARGING WAIT TIME CALCULATION SYSTEM AND METHOD

(71) Applicant: Nissan Motor Co., Ltd., Yokohama-shi, Kanagawa (JP)

(72) Inventors: Haruyuki Saito, Kanagawa (JP); Takeshi Tsuda, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 16/065,951

(22) PCT Filed: Nov. 28, 2016

(86) PCT No.: PCT/JP2016/085206
§ 371 (c)(1),
(2) Date: Jun. 25, 2018

(87) PCT Pub. No.: WO2017/119212
PCT Pub. Date: Jul. 13, 2017

(65) Prior Publication Data
US 2019/0009683 A1 Jan. 10, 2019

(30) Foreign Application Priority Data
Jan. 7, 2016 (JP) .................................. 2016-001852

(51) Int. Cl.
*H02J 7/00* (2006.01)
*H02J 7/14* (2006.01)
(Continued)

(52) U.S. Cl.
CPC ......... *B60L 11/1848* (2013.01); *B60L 53/665* (2019.02); *G06Q 10/06* (2013.01);
(Continued)

(58) Field of Classification Search
CPC .................................................. B60L 11/1848
(Continued)

(56) References Cited

U.S. PATENT DOCUMENTS 5,034,739 A * 7/1991 Gruhl ........................ E04H 6/42
340/932.2
5,966,000 A * 10/1999 Yang ................... B60L 11/1851
180/65.8
(Continued)

FOREIGN PATENT DOCUMENTS

JP 201124333 A 2/2011
JP 2011214930 A 10/2011
(Continued)

OTHER PUBLICATIONS

Definition of "Waiting time", <https://www.google.com/search?q=define+waiting+time&rlz=1C1GCEB_enUS792US792&oq=define+waiting+time&aqs=chrome..69i57j015.9023j1j8&sourceid=chrome&ie=UTF-8>.*
(Continued)

*Primary Examiner* — Alexis B Pacheco
(74) *Attorney, Agent, or Firm* — Young Basile Hanlon & MacFarlane, P.C.

(57) ABSTRACT

Each time the charging of an electric vehicle is executed at a charging station, charging information is acquired which is information on a charged capacity by one charging or a time required for one charging, and identification information of the electric vehicle is acquired. Each charging time, the acquired charging information and the acquired identification information are stored in an information storage unit so that they are associated with each other. The identification information of an electric vehicle is acquired which is waiting for charging at a charging station as a calculation object for which a charging wait time is calculated. The charging information corresponding to the acquired identi-
(Continued)

fication information of the electric vehicle waiting for charging is extracted from the stored charging information. The charging wait time at the charging station as the calculation object is calculated on the basis of the extracted charging information.

11 Claims, 4 Drawing Sheets

(51) Int. Cl.
  *B60L 11/18* (2006.01)
  *G08G 1/00* (2006.01)
  *G06Q 50/10* (2012.01)
  *G06Q 10/06* (2012.01)
  *B60L 53/66* (2019.01)
  *G08G 1/017* (2006.01)

(52) U.S. Cl.
  CPC ............... *G06Q 50/10* (2013.01); *G08G 1/00* (2013.01); *G08G 1/0175* (2013.01); *H02J 7/00* (2013.01)

(58) Field of Classification Search
  USPC ........................................................ 320/109
  See application file for complete search history.

(56) References Cited

U.S. PATENT DOCUMENTS

| | | | |
|---|---|---|---|
| 2009/0299918 A1* | 12/2009 | Cook | G06Q 30/04 705/412 |
| 2010/0049737 A1* | 2/2010 | Ambrosio | B60L 11/1824 705/412 |
| 2015/0202975 A1 | 7/2015 | Solomon et al. | |
| 2015/0286965 A1 | 10/2015 | Amano et al. | |
| 2016/0264011 A1 | 9/2016 | Yasukawa et al. | |
| 2016/0300162 A1* | 10/2016 | McManus | G06Q 10/02 |

FOREIGN PATENT DOCUMENTS

| | | |
|---|---|---|
| JP | 2014155351 A | 8/2014 |
| WO | 2015053163 A1 | 4/2015 |
| WO | 2015063967 A1 | 5/2015 |

OTHER PUBLICATIONS

Chan, C. C., et al., Modern Electric Vehicle Technology, University Press, Nov. 15, 2001, pp. 273-274.
Wikipedia: Electronic toll collection, Dec. 15, 2015, URL:https://en.wikipedia.org/w/index.php?title=Electronic_toll_collection&oldid=695414585.
Wikipedia: Automatic number-plate recognition, Jan. 4, 2016, URL:https://en.wikipedia.orgfw/index.php?title=Automatic number-plate recognition&oldid=698253887.
Wikipedia: Abschnittskontrolle, Sep. 4, 2015, URL:https://de.wikipedia.orgfw/index.php?title=Abschnittskontrolle&oldid=145715919.
Jens Christian Keuthen, Die abschnittsbezogene Geschwindigkeitsuberwachung und ihre verfassungsrechtliche Bewertung, Nov. 29, 2015, Springer, Ch 3.
Boscorelli: Electric Vehicle Charging 1-11 Station in Work, Feb. 12, 2015 URL:https:ffwww.alamy.com/stock-photo-electric-vehicle-charging-station-in-workphotorealistic-3d-illustration-82591886.html.
Wikipedia: "IEC 62196", Dec. 23, 2015, XP055501139, URL:https://en.wikipedia.org/w/index.php?title=IEC_62196&oldid=696500433 [retrieved on Aug. 21, 2018].
Wikipedia: "Toll Collect", Dec. 13, 2015, XP055593881, URL:https://de.wikipedia.org/w/index.php?title=Toll_Collect&oldid=149029169 [retrieved on Jun. 4, 2019].
Claudia Campolo et al: "Vehicular ad hoc Networks: Standards, Solutions, and Research Vehicular ad hoc Networks: Standards, Solutions, and Research", Jun. 1, 2015 (Jun. 1, 2015), Springer, XP055593931, ISBN: 978-3-319-15496-1 pages ToC,Ch01-Ch05,Ch08-Ch09,Ch15-Ch18.
Michele Fiorini et al: "Clean Mobility and Intelligent Transport Systems", Sep. 23, 2015 (Sep. 23, 2015), The Institution of Engineering and Technology, XP055542221, ISBN: 978-1-84919-895-0 pagea ToC,Ch02-Ch04,Ch07-Ch08,Ind.
Electricvehiclejunki: "EVjunkie.com tests out a CHAdeMO fast charger on a Peugeot iON in Östersund, Sweden", YouTube video, Dec. 9, 2011 (Dec. 9, 2011), XP055593756, URL:https://www.youtube.com/watch?v=pqcqdbrfOzA [retrieved on Jun. 4, 2019].
Staff: "New Jersey DOT Adds Travel-Time Signage for Highways", Jan. 30, 2013 (Jan. 30, 2013), XP055594037, URL:https://www.automotive-fleet.com/109660/new-jersey-dot-adds-travel-time-signage-for-highways [retrieved on Jun. 4, 2019].

\* cited by examiner

CHARGING WAIT TIME CALCULATION SYSTEM AND METHOD

CROSS-REFERENCE TO RELATED APPLICATIONS

The present application is based on Japanese Patent Application No. 2016-001852 filed on Jan. 7, 2016, the entire content of which is herein incorporated by reference.

TECHNICAL FIELD

The present invention relates to a charging wait time calculation system and a charging wait time calculation method for electric vehicles.

BACKGROUND

A system for calculating the charging wait time for an electric vehicle at a charging station is known (see Japanese Patent Application JP2011-214930A, for example). In this system, battery information such as the rated capacity and remaining capacity of a battery is transmitted from a communication device equipped in the electric vehicle to a charging wait time information presentation device provided at the charging station. The charging wait time at the charging station is calculated in the charging wait time information presentation device.

The system described in Japanese Patent Application JP2011-214930A requires equipping the electric vehicle with a dedicated communication device for collecting the above battery information from the electric vehicle. The problem is therefore that the charging wait time at a charging station cannot be calculated for an electric vehicle that is not equipped with such a dedicated communication device.

SUMMARY

A problem to be solved by the present invention is to provide a charging wait time calculation system and a charging wait time calculation method that do not require equipping the electric vehicle with a dedicated communication device for collecting the battery information.

The present invention solves the above problem as follows. Each time the charging of an electric vehicle is executed at a charging station, charging information is acquired which is information on a charged capacity or a time required for charging. Each time the charging of an electric vehicle is executed at a charging station, identification information of the electric vehicle is acquired. Each time the charging of an electric vehicle is executed at a charging station, the acquired charging information and the acquired identification information are stored in an information storage so that they are associated with each other. The identification information of an electric vehicle is acquired which is waiting for charging at a charging station as a calculation object for which a charging wait time is calculated. The charging information corresponding to the acquired identification information of the electric vehicle waiting for charging is extracted from the stored charging information in the information storage. The charging wait time at the charging station as the calculation object is calculated on the basis of the extracted charging information.

According to the present invention, the above charging information in past times stored in the information storage is utilized and an effect is therefore obtained that the charging wait time for the electric vehicle at the charging station can be calculated without equipping the electric vehicle with a dedicated communication device for collecting the battery information.

DETAILED DESCRIPTION

Figure 1:
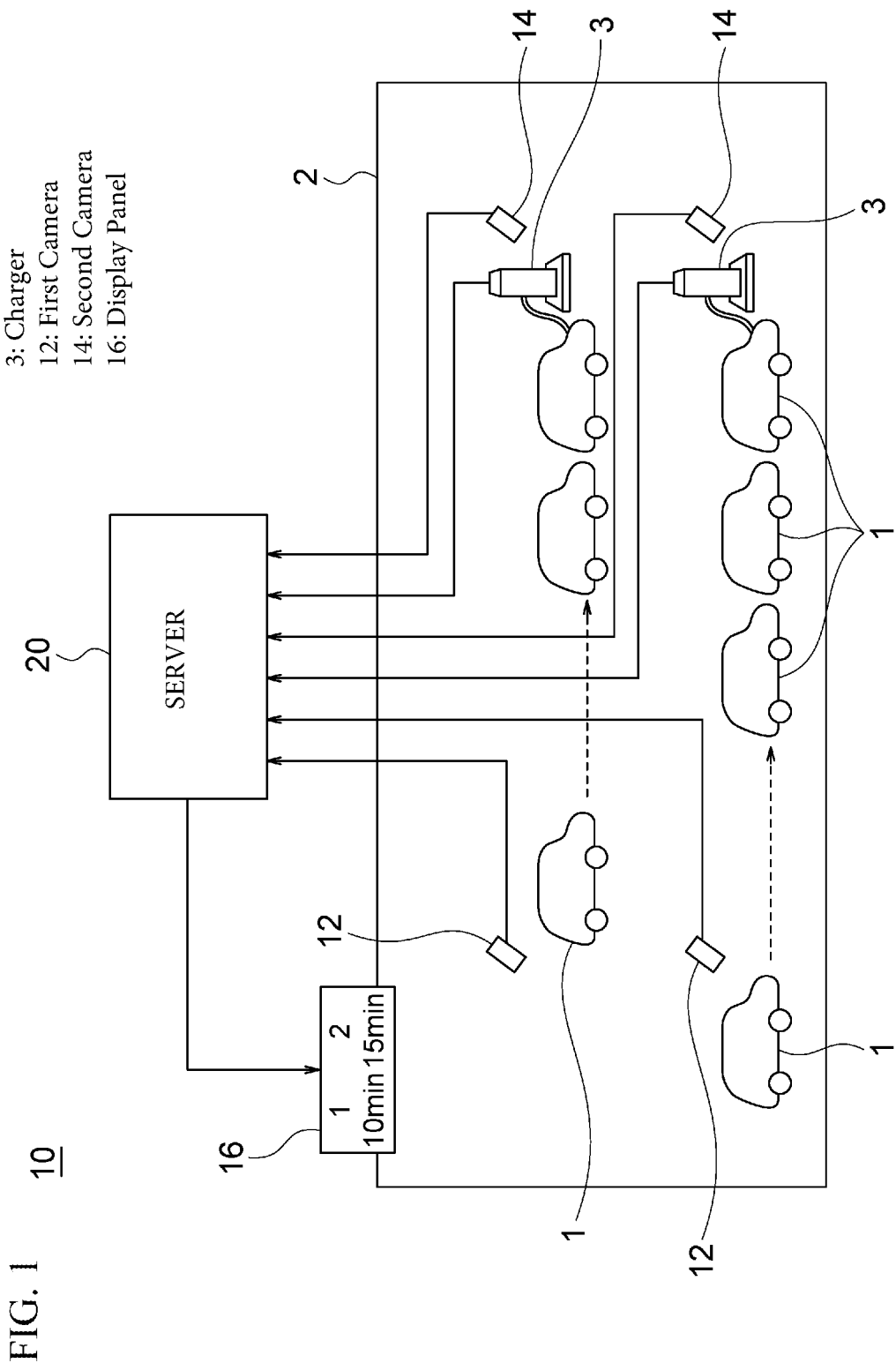
FIG. 1 is a diagram illustrating the overview of a charging wait time calculation system according to a first embodiment of the present invention.

Hereinafter, one or more embodiments of the present invention will be described with reference to the drawings. FIG. 1 is a diagram illustrating the overview of a charging wait time calculation system 10 according to a first embodiment of the present invention. The charging wait time calculation system 10 calculates a charging wait time for an electric vehicle 1, such as an electric car or a plug-in hybrid car, to wait for charging at a charging station 2. The electric vehicle 1 is equipped with a battery that can be charged at the charging station 2 (by a charger provided outside the vehicle).

The charging wait time calculation system 10 comprises first cameras 12, second cameras 14, and a display panel 16 that are disposed in the charging station 2, and a server 20. The server 20 is connected to first cameras 12, second cameras 14, display panels 16, and chargers 3 of a number of charging stations 2 existing in various places via wireless or wired communication lines. The server 20 stores charging information (in the present embodiment, information on a capacity charged by one charging) of electric vehicles 1 at a number of charging stations 2 existing in various places together with identification information of the charged electric vehicles 1 so that these information items are associated with each other. Then, the server 20 calculates the charging wait time for an electric vehicle 1 at the charging station 2 as a calculation object on the basis of the stored past information. The server 20 then delivers the information on the calculated charging wait time to one or more destinations, such as the display panel 16 disposed in the charging station 2 as the calculation object, navigation systems, and media. The configuration of the server 20 and the contents of processing will be described later.

Each first camera 12 is disposed at the entrance of a standby lane for a charger 3 and images the license plate of an electric vehicle 1 traveling into the standby lane. On the other hand, each second camera 14 is disposed in the vicinity of a charger 3 and images the license plate of an electric vehicle 1 being charged by the charger 3. The imaging information acquired by the first camera 12 and the second camera 14 is transmitted to the server 20. As illustrated in FIG. 1, when a number of chargers 3 are disposed in the charging station 2, the first camera 12 and the second camera 14 are provided for each charger 3. If one camera can image both the license plate of an electric vehicle 1 traveling into the standby lane and the license plate of an electric vehicle 1 being charged by the charger 3, the first camera 12 and the second camera 14 may be composed of one camera, but in the present example, the first camera 12 and the second camera 14 are composed of separate cameras.

The display panel 16 is disposed in the charging station 2 and displays the charging wait time for the electric vehicle 1 transmitted from the server 20. As illustrated in FIG. 1, when a number of chargers 3 are provided in the charging station 2, the display panel 16 displays the charging wait time at each charger 3.

Figure 2:
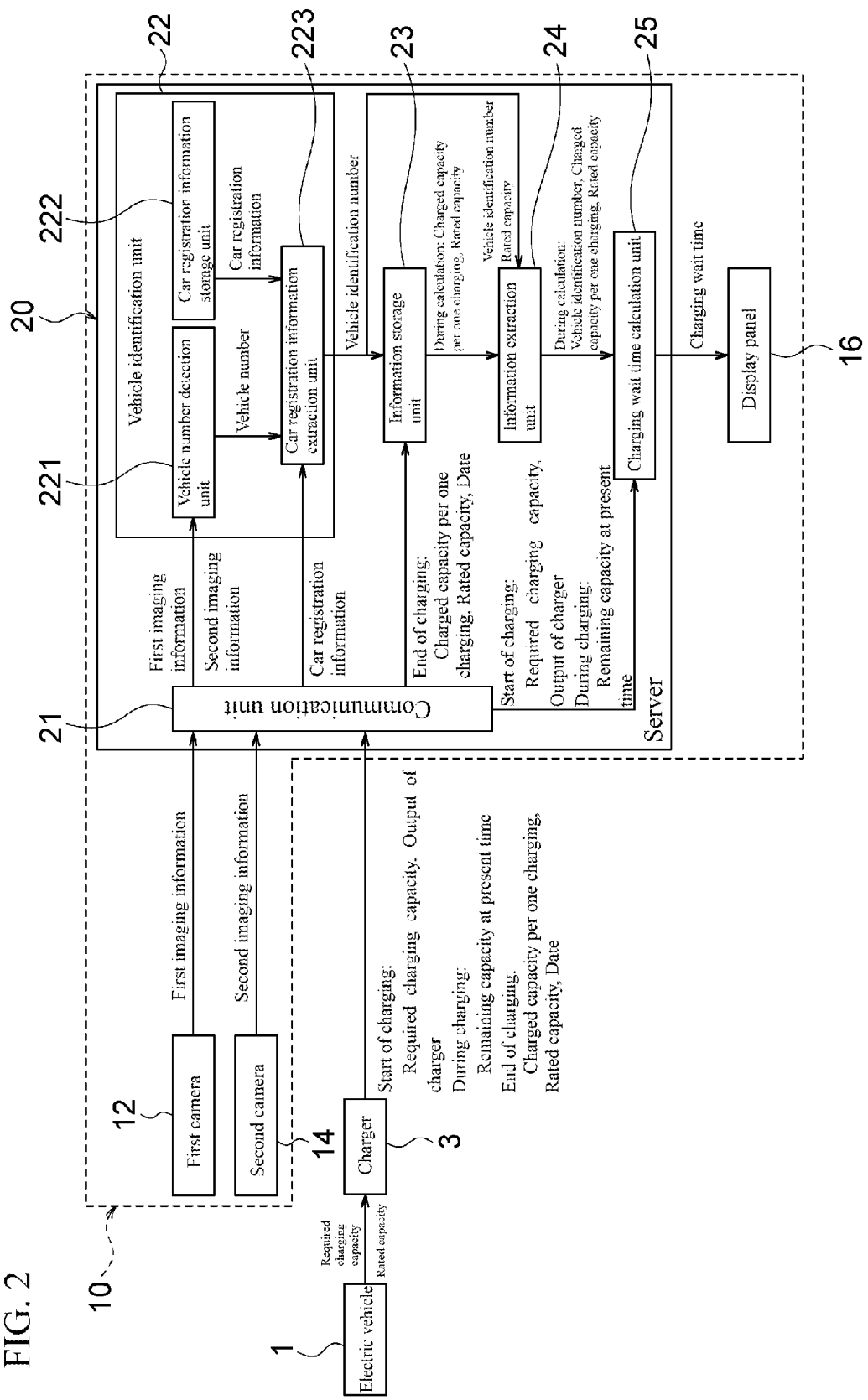
FIG. 2 is a block diagram illustrating the charging wait time calculation system of FIG. 1 in more detail.

FIG. 2 is a block diagram illustrating the overview of the charging wait time calculation system 10. As illustrated in the figure, the server 20 comprises a communication unit 21, a vehicle identification unit 22, an information storage unit 23, an information extraction unit 24, and a charging wait time calculation unit 25. The communication unit 21 is connected to the first cameras 12, the second cameras 14, and the chargers 3 of a number of charging stations 2 existing in various places via wireless or wired communication lines.

The communication unit 21 receives the imaging information including the license plates of the electric vehicles 1 from the first camera 12 and the second camera 14. When starting the charging, the communication unit 21 receives the information on a required charging capacity and the information on the output of the charger 3 from the charger 3. During the charging, the communication unit 21 receives the information on a remaining capacity of the battery at the present time from the charger 3. Each time the charging is completed, the communication unit 21 receives, from the charger 3, the information on the charged capacity (the amount of change in the remaining capacity from the start of charging to the completion of charging), the information on a rated capacity of the charged battery of the electric vehicle 1, and the information on the time and date. The capacity as referred to in the present example means a power amount Wh or a current amount Ah.

The above required charging capacity is a remaining capacity at the time when the charging is completed by one charging designated for the electric vehicle 1. The required charging capacity is transmitted from the electric vehicle 1 to the charger 3 via a communication line wired with the charging cable and then transmitted from the charger 3 to the communication unit 21. The required charging capacity, which is a value that is preliminarily set, may be a full charge capacity (i.e. the rated capacity), for example, or may also be a value that is set by the user of the vehicle (e.g. a capacity corresponding to 80% of the full charge capacity), but the present example will be described on the assumption that the required charging capacity is the full charge capacity because the user of the vehicle may ordinarily perform charging to the full charge by one charging. The information on the rated capacity of the battery of the electric vehicle 1 is transmitted from the electric vehicle 1 to the charger 3 via the above communication line and then transmitted from the charger 3 to the communication unit 21.

The vehicle identification unit 22 comprises a vehicle number detection unit 221, a car registration information storage unit 222, and a car registration information extraction unit 223. The vehicle number detection unit 221 analyzes the imaging information received from the first camera 12 via the communication unit 21 thereby to detect the car registration number or vehicle number (simply referred to as a "vehicle number," hereinafter) stamped on the license plate of the electric vehicle 1 traveling into the standby lane for the charger 3. The vehicle number detection unit 221 also analyzes the imaging information received from the second camera 14 via the communication unit 21 thereby to detect the vehicle number stamped on the license plate of the electric vehicle 1 charged by the charger 3.

The car registration information storage unit 222 stores car registration information of the electric vehicle 1 stored in a car registration management database which the transportation department manages. The car registration information includes the vehicle number, the vehicle identification number, the vehicle type, the rated capacity of the battery, and other necessary information. The car registration information stored in the car registration information storage unit 222 is updated at regular intervals.

The car registration information extraction unit 223 extracts the car registration information, which includes the vehicle number detected by the vehicle number detection unit 221, from the car registration information storage unit 222. Then, the car registration information extraction unit 223 transmits the information on the vehicle identification number included in the extracted car registration information to the information storage unit 23 and the information extraction unit 24. In addition, the car registration information extraction unit 223 transmits the information on the rated capacity of the battery included in the extracted car registration information to the information extraction unit 24.

Each time the charging is completed, the information storage unit 23 stores the information on the charged capacity, the information on the rated capacity of the charged battery of the electric vehicle 1, the information on the output of the charger 3, and the information on the time and date, which are received from the charger 3 via the communication unit 21, in association with the vehicle identification number identified by the vehicle identification unit 22 from the imaging information of the second camera 14. Table 1 presented below is a table that lists examples of the information stored in the information storage unit 23.

TABLE 1

| Vehicle identification number | Rated capacity [kWh] | Time and date | Charged capacity [kWh] | Charger output [kW] |
|---|---|---|---|---|
| AAA | 24 | 10:00 Jan. 1 | 19 | 45 |
| AAA | 24 | 10:30 Jan. 2 | 17 | 45 |
| BBB | 12 | 10:00 Jan. 2 | 8 | 45 |
| BBB | 12 | 12:00 Jan. 3 | 10 | 45 |

When the vehicle identification unit 22 identifies the vehicle identification number of the electric vehicle 1, which is traveling into the standby lane for the charger 3, from the imaging information of the first camera 12, the information extraction unit 24 extracts the above-described information stored in the information storage unit 23 in association with the vehicle identification number. Here, if the vehicle identification number identified from the imaging information of the first camera 12 by the vehicle identification unit 22 is not stored in the information storage unit 23, the information extraction unit 24 extracts the above-described information of another electric vehicle 1 of which the battery rated capacity is the same as that of the electric vehicle 1 having the vehicle identification number. As described above, the information on the battery rated capacity of the electric vehicle 1 having the vehicle identification number is transmitted from the car registration information extraction unit 223 to the information extraction unit 24.

The charging wait time calculation unit 25 calculates a charging wait time T3 for each charger 3 in accordance with the following formulae (1) to (3). The following formula (1)

is an equation for calculating an estimated charging time T1 for each electric vehicle 1 that is waiting for charging. The charging wait time calculation unit 25 calculates the estimated charging time T1 for the electric vehicle 1 having the vehicle identification number from when the vehicle identification unit 22 identifies the vehicle identification number from the imaging information of the first camera 12 to when the vehicle identification unit 22 identifies the vehicle identification number from the imaging information of the second camera 14.

$$T1 = \text{Charging capacity [kWh]} \div \text{Charger output [kW]} \quad (1)$$

Table 2 is a table that lists the results of calculating the estimated charging time T1 for the examples listed in Table 1.

TABLE 2

| Vehicle identification number of vehicle waiting for charging | Rated capacity [kWh] | Average value of charged capacity [kWh] | Charger output [kW] | Estimated charging time [h] |
|---|---|---|---|---|
| AAA | 24 | 18 | 45 | 0.4 |
| BBB | 12 | 9 | 45 | 0.2 |

Here, the charging capacity [kWh] is the average value of values that are stored in the information storage unit 23 and extracted by the information extraction unit 24. For example, as listed in Table 1, when the electric vehicle 1 having a vehicle identification number AAA was charged twice in past times and respective charged capacities were 19 [kWh] and 17 [kWh], the charged capacity [kWh] of the electric vehicle 1 is 18 [kWh], as listed in Table 2. Likewise, as listed in Table 1, when the electric vehicle 1 having a vehicle identification number BBB was charged twice in past times and respective charged capacities were 8 [kWh] and 10 [kWh], the charged capacity [kWh] of the electric vehicle 1 is 9 [kWh], as listed in Table 2. In an alternative embodiment, the charged capacity [kWh] may be a median value, a mode value, a latest value, or other available value as substitute for the average value of the values stored in the information storage unit 23.

The charger output [kW] is the average value of values that are stored in the information storage unit 23 and extracted by the information extraction unit 24. For example, as listed in Table 1, when the electric vehicle 1 having the vehicle identification number AAA was charged twice in past times and respective charger outputs were all 45 [kW], the charger output [kW] is 45 [kW], as listed in Table 2.

For example, the estimated charging time T1 for the vehicle identification number AAA of the example listed in Table 1 is as follows.

$$T1 = 18 \div 45 = 0.4 \text{ [h]}$$

Likewise, the estimated charging time T1 for the vehicle identification number BBB of the example listed in Table 1 is as follows.

$$T1 = 9 \div 45 = 0.2 \text{ [h]}$$

The following formula (2) is an equation for calculating a remaining charging time T2 for the electric vehicle 1 being charged.

$$T2 = (\text{Required charging capacity [kWh]} - \text{Remaining capacity [kWh]}) \div \text{Charger output [kW]} \quad (2)$$

The remaining capacity [kWh] is a charged capacity that remains in the battery at the time of calculating the remaining charging time T2.

The following formula (3) is an equation for calculating the charging wait time T3 for each charger 3. That is, the charging wait time T3 for each charger 3 is obtained by adding the sum of estimated charging times T1 calculated by the above formula (1) for the electric vehicles 1 waiting for charging to the remaining charging time T2 calculated by the above formula (2) for the electric vehicle 1 being charged.

$$T3 = \Sigma T1 + T2 \quad (3)$$

For example, when the required charging capacity [kWh] for the electric vehicle 1 being charged is 30 kWh, the remaining capacity [kWh] of the electrical vehicle 1 being charged is 10 kWh, the output of the charger 3 is 40 kW, and two electric vehicles 1 of the vehicle identification numbers AAA and BBB listed in Table 2 are waiting for charging, the charging wait time T3 is as follows.

$$\Sigma T1 = 0.4 + 0.2 = 0.6 \text{ [h]}$$

$$T2 = (30 - 10) \div 40 = 0.5 \text{ [h]}$$

$$T3 = 0.6 + 0.5 = 1.1 \text{ [h]}$$

Here, when the information storage unit 23 stores the vehicle identification number which is identified by the vehicle identification unit 22 from the imaging information of the first camera 12, the charging wait time calculation unit 25 calculates the charging wait time T3 on the basis of the information stored in the information storage unit 23 in association with the vehicle identification number. On the other hand, when the information storage unit 23 does not store the vehicle identification number which is identified by the vehicle identification unit 22 from the imaging information of the first camera 12, the information extraction unit 24 extracts, from the information storage unit 23, information on another electric vehicle 1 of which the battery rated capacity is the same as that of the electric vehicle 1 having the vehicle identification number, and the charging wait time calculation unit 25 calculates the charging wait time T3 on the basis of the information on the other electric vehicle 1 extracted by the information extraction unit 24.

Table 3 presented below is a table that lists examples of the information stored in the information storage unit 23. Table 4 presented below is a table that lists the results of calculating the estimated charging time T1 for the examples listed in Table 3.

TABLE 3

| Vehicle identification number | Rated capacity [kWh] | Time and date | Charged capacity [kWh] | Charger output [kW] |
|---|---|---|---|---|
| AAA | 24 | 10:00 Jan. 1 | 19 | 45 |
| AAA | 24 | 10:30 Jan. 2 | 17 | 45 |
| BBB | 12 | 10:00 Jan. 2 | 8 | 45 |
| BBB | 12 | 10:00 Jan. 4 | 10 | 45 |
| BBB | 12 | 10:00 Jan. 5 | 10 | 45 |
| BBB | 12 | 10:00 Jan. 6 | 8 | 45 |
| CCC | 24 | 11:00 Jan. 2 | 19 | 45 |
| CCC | 24 | 12:00 Jan. 3 | 17 | 45 |

TABLE 4

| Vehicle identification number of vehicle waiting for charging | Rated capacity [kWh] | Average value of charged capacity [kWh] | Charger output [kW] | Estimated charging time [h] |
|---|---|---|---|---|
| AAA | 24 | 18 | 45 | 0.4 |
| BBB | 12 | 9 | 45 | 0.2 |
| CCC | 24 | 18 | 45 | 0.4 |
| DDD | 24 | 18 | 45 | 0.4 |

For example, when the vehicle identification number identified by the vehicle identification unit 22 from the imaging information of the first camera 12 is DDD, the information extraction unit 24 extracts, from the information storage unit 23, information on other electric vehicles 1 (vehicle identification number AAA and vehicle identification number BBB) of which the battery rated capacity (24 [kWh]) is the same as that of the electric vehicle 1 having the vehicle identification number DDD. Then, the charging wait time calculation unit 25 calculates the estimated charging time T1 on the basis of the average value (18 [kWh]) of the charged capacities [kWh], which are stored in the information storage unit 23, of the electric vehicles 1 having the vehicle identification numbers AAA and CCC. In the examples listed in Table 3, the estimated charging time T1 for the vehicle identification number DDD is as follows.

$$T1 = 18 \div 45 = 0.4 \text{ [h]}$$

With regard to the charging wait time T3, for example, when the required charging capacity [kWh] for the electric vehicle 1 being charged is 30 kWh, the remaining capacity [kWh] of the electrical vehicle 1 being charged is 10 kWh, the output of the charger 3 is 40 kW, and two electric vehicles 1 of the vehicle identification numbers AAA and DDD listed in Table 4 are waiting for charging, the charging wait time T3 is as follows.

$$\Sigma T1 = 0.4 + 0.4 = 0.8 \text{ [h]}$$

$$T2 = (30 - 10) \div 40 = 0.5 \text{ [h]}$$

$$T3 = 0.8 + 0.5 = 1.3 \text{ [h]}$$

The charging wait time calculation system 10 of the present embodiment is configured and operates as described above; therefore, the following effects are obtained.

(1) In the charging wait time calculation system 10 of the present embodiment, each time the charging of an electric vehicle 1 is executed at the charging station 2, information on the charged capacity (referred to as "charged capacity information," hereinafter) is acquired, the identification information of the electric vehicle 1 is acquired, and the acquired charged capacity information and the acquired identification information of the electric vehicle 1 are stored in the information storage unit 23 so as to be associated with each other. Here, the charged capacity information can be acquired from the charger 3. The identification information of the electric vehicle 1 can be acquired through analyzing the imaging information of the second camera 14 to detect the vehicle number and crosschecking the vehicle number and the car registration information. Then, the identification information of the electric vehicle 1 is acquired which is waiting for charging at the charging station 2 as a calculation object for which the charging wait time is calculated, the charged capacity information corresponding to the identification information of the electric vehicle 1 waiting for charging is extracted from the past charged capacity information stored in the information storage unit 23, and the charging wait time at the charging station 2 as the calculation object is calculated on the basis of the extracted charged capacity information. Here, the identification information of the electric vehicle 1 waiting for charging can be acquired through analyzing the imaging information of the first camera 12 to detect the vehicle number and crosschecking the vehicle number and the car registration information. Thus, the charging wait time for the electric vehicle 1 at the charging station 2 can be calculated while reducing the cost for equipping the electric vehicle 1 with a dedicated onboard device for collecting information, such as a rated capacity and a remaining capacity of the battery of the electric vehicle 1 waiting for charging.

(2) According to the charging wait time calculation system 10 of the present embodiment, the sum of the remaining charging time for the electric vehicle 1 being charged and the charging time for the electric vehicle 1 waiting for charging is calculated; therefore, the charging wait time for the electric vehicle 1 at the charging station 2 can be calculated with a higher degree of accuracy.

(3) According to the charging wait time calculation system 10 of the present embodiment, the charged capacity information is organized for each electric vehicle 1 and stored in the information storage unit 23, and the charging wait time for the electric vehicle 1 at the charging station 2 is calculated using such charged capacity information. That is, the charging wait time for the electric vehicle 1 at the charging station 2 is calculated on the basis of the tendency of charging in past times of each electric vehicle 1 waiting for charging. Here, a certain tendency appears in the past charging of the electric vehicle 1 in accordance with the environment in which the electric vehicle 1 is used. For example, a certain tendency appears in the capacity to be charged in accordance with the distance between the parking lot for the electric vehicle 1 and a neighboring charging station 2. The charging wait time for the electric vehicle 1 at the charging station 2 can therefore be calculated with a sufficient degree of accuracy while reducing the cost for equipping the electric vehicle 1 with the above-described dedicated onboard device.

(4) According to the charging wait time calculation system 10 of the present embodiment, the charging wait time for the electric vehicle 1 at the charging station 2 is calculated on the basis of the average value of the charged capacities extracted from the information storage unit 23. That is, the charging wait time for the electric vehicle 1 at the charging station 2 is calculated using a value obtained by further averaging the past charged capacities in which a certain tendency appears. The charging wait time for the electric vehicle 1 at the charging station 2 can therefore be calculated with a sufficient degree of accuracy while reducing the cost for equipping the electric vehicle 1 with the above-described dedicated onboard device.

(5) In the charging wait time calculation system 10 of the present embodiment, each time the charging of an electric vehicle 1 is executed at the charging station 2, information on the rated capacity of the battery of the electric vehicle 1 is stored in the information storage unit 23 in addition to the above charged capacity information so as to be associated with the identification information of the electric vehicle 1. Here, the information on the rated capacity of the battery can be acquired by crosschecking the car registration information therewith. Then, when the charged capacity information corresponding to the identification information of the electric vehicle 1 waiting for charging is not stored in the information storage unit 23, the charged capacity information of another electric vehicle 1 of which the rated capacity of the battery is the same as that of the electric vehicle 1 is extracted from the information storage unit 23 and used for calculation of the charging wait time. Thus, even when electric vehicles 1 waiting for charging include an electric vehicle 1 of which the charging history is not stored in the information storage unit 23, the charging wait time can be calculated so as to include the charging time for that electric vehicle 1.

(6) In the charging wait time calculation system 10 of the present embodiment, the first camera 12 images the license plate of the electric vehicle 1 waiting for charging, and the imaging information of the first camera 12 is analyzed to detect the number of the license plate of the electric vehicle 1. Here, the car registration information of the electric vehicle 1 is stored in the car registration information storage unit 222 in association with the number of the license plate. This allows the car registration information corresponding to the detected number to be extracted from the car registration information storage unit 222, and the identification information of the electric vehicle 1 waiting for charging can thereby be acquired without providing a dedicated onboard device for collecting the identification information of the electric vehicle 1.

(7) In the charging wait time calculation system 10 of the present embodiment, the second camera 14 images the license plate of the electric vehicle 1 being charged, and the imaging information of the second camera 14 is analyzed to detect the number of the license plate of the electric vehicle 1. As described above, the car registration information of the electric vehicle 1 is stored in the car registration information storage unit 222 in association with the number of the license plate. This allows the car registration information corresponding to the detected number to be extracted from the car registration information storage unit 222, and the identification information of the electric vehicle 1 being charged can thereby be acquired without providing a dedicated onboard device for collecting the identification information of the electric vehicle 1.

Table 5 presented below is a table that lists examples of the information stored in the information storage unit 23 of the charging wait time calculation system 10 according to a first example. Table 6 presented below is a table that lists the result of calculating the estimated charging time T1 for the examples listed in Table 5.

TABLE 5

| Vehicle identification number | Rated capacity [kWh] | Time and date | Charged capacity [kWh] | Charger output [kW] | Weekday/ Holiday |
|---|---|---|---|---|---|
| AAA | 24 | 10:00 Feb. 1 | 22 | 45 | Weekday |
| AAA | 24 | 10:30 Feb. 2 | 20 | 45 | Weekday |
| AAA | 24 | 10:00 Feb. 5 | 18 | 45 | Weekday |
| AAA | 24 | 10:00 Feb. 6 | 10 | 45 | Holiday |

TABLE 6

| Vehicle identification number of vehicle waiting for charging | Rated capacity [kWh] | Average value of charged capacity [kWh] | Charger output [kW] | Estimated charging time [h] |
|---|---|---|---|---|
| AAA | 24 | 20 | 45 | 0.44 |

As listed in Table 5, in the charging wait time calculation system 10 of the present example, each time one charging is completed, the information storage unit 23 stores information as to whether the date on which the electric vehicle 1 is charged is a weekday or a holiday, information on the charged capacity, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14.

When the calculation process for the charging wait time is executed on a weekday in the charging waiting time calculation system 10 of the present example, the information extraction unit 24 extracts only the weekday information stored in the information storage unit 23. On the other hand, when the calculation process for the charging wait time T3 is executed on a holiday in the charging wait time calculation system 10 of the present example, the information extraction unit 24 extracts only the holiday information stored in the information storage unit 23.

For example, when the calculation process for the estimated charging time T1 for the electric vehicle 1 of the vehicle identification number AAA is executed on a weekday in the charging wait time calculation system 10 of the present example, the information extraction unit 24 extracts information on the three times of charging carried out on weekdays from information on the four times of charging of the vehicle identification number AAA stored in the information storage unit 23. The charging wait time calculation unit 25 calculates the estimated charging time T1 for the electric vehicle 1 of the vehicle identification number AAA on the basis of the information on the three times of charging extracted by the information extraction unit 24.

As described above, in the charging wait time calculation system 10 of the present example, each time the charging of an electric vehicle 1 is executed at the charging station 2, the information storage unit 23 stores the charged capacity information, the information on the classification of the date on which the charging is executed (in the present example, information as to whether the date is a weekday or a holiday), and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charged capacity information, which corresponds to the acquired identification information of the electric vehicle 1 waiting for charging and corresponds to the classification of the date on which the charging wait time is calculated, from the charged capacity information in past times stored in the information storage unit 23, and calculating the charging wait time at the charging station 2 as the calculation object on the basis of the extracted charged capacity information. Here, the tendency of past charging of the electric vehicle 1 differs in accordance with the classification of the date on which charging is performed. For example, the tendency of the charging capacity differs between a weekday and a holiday. Thus, the charged capacity information in past times to be used for the calculation process for the charging wait time can be selected in accordance with the classification of the date on which charging is performed, thereby to highly accurately calculate the charging wait time for the electric vehicle 1 at the charging station 2.

Table 7 presented below is a table that lists the information stored in the information storage unit 23 of the charging wait time calculation system 10 according to a second example. Table 8 presented below is a table that lists the result of calculating the estimated charging time T1 for the examples listed in Table 7.

TABLE 7

| Vehicle identification number | Rated capacity [kWh] | Time and date | Charged capacity [kWh] | Charger output [kW] | External temperature when starting charging [C.°] |
|---|---|---|---|---|---|
| AAA | 24 | 10:00 Feb. 1 | 22 | 45 | 20 |
| AAA | 24 | 10:30 Feb. 2 | 20 | 45 | 23 |
| AAA | 24 | 10:00 Feb. 5 | 18 | 45 | 22 |
| AAA | 24 | 10:00 Feb. 6 | 10 | 45 | 26 |

TABLE 8

| Vehicle identification number of vehicle waiting for charging | Rated capacity [kWh] | Average value of charged capacity [kWh] | Charger output [kW] | Estimated charging time [h] |
|---|---|---|---|---|
| AAA | 24 | 20 | 45 | 0.44 |

As listed in Table 7, in the charging wait time calculation system 10 of the present example, each time one charging is completed, the information storage unit 23 stores information on the external temperature when starting the charging of the electric vehicle 1, the charged capacity information, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14.

In the charging wait time calculation system 10 of the present example, the information extraction unit 24 extracts the information stored in the information storage unit 23 in accordance with the external temperature [° C.] when executing the calculation process for the charging wait time. Table 9 presented below is a table in which the external temperature [° C.] when executing the calculation process for the charging wait time and the external temperature [° C.] when starting the charging of the electric vehicle 1 are classified into categories A, B, C, and D.

TABLE 9

| Category | External temperature [° C.] when starting charging |
|---|---|
| A | Lower than 10° C. |
| B | 10° C. or higher and lower than 25° C. |
| C | 25° C. or higher and lower than 30° C. |
| D | 30° C. or higher |

As listed in this table, the category A corresponds to a case in which the external temperature [° C.] is lower than 10° C., the category B corresponds to a case in which the external temperature [° C.] is 10° C. or higher and lower than 25° C., the category C corresponds to a case in which the external temperature [° C.] is 25° C. or higher and lower than 30° C., and the category D corresponds to a case in which the external temperature [° C.] is 30° C. or higher.

In the charging wait time calculation system 10 of the present example, the information extraction unit 24 extracts only the information on the corresponding category from the information stored in the information storage unit 23. For example, when the external temperature [° C.] is 20° C., the information extraction unit 24 extracts information on the three times of charging, which corresponds to the category B, from information on the four times of charging of the vehicle identification number AAA stored in the information storage unit 23. The charging wait time calculation unit 25 calculates the estimated charging time T1 for the electric vehicle 1 of the vehicle identification number AAA on the basis of the information on the three times of charging extracted by the information extraction unit 24.

As described above, in the charging wait time calculation system 10 of the present example, each time the charging of an electric vehicle 1 is executed at the charging station 2, the information storage unit 23 stores the charged capacity information, the information on the temperature zone of external air when starting the charging, and the identification information of the electric vehicle 1 so that these information items are associated with one another. This process is followed by acquiring the identification information of the electric vehicle 1 waiting for charging at the charging station 2 as the calculation object, extracting the charged capacity information, which corresponds to the identification information of the electric vehicle 1 waiting for charging and corresponds to the temperature zone of external air when calculating the charging wait time, from the charged capacity information in past times stored in the information storage unit 23, and calculating the charging wait time at the charging station 2 as the calculation object on the basis of the extracted charged capacity information. Here, the tendency of past charging differs in accordance with the temperature zone of external air. Thus, the charged capacity information in past times to be used for the calculation process for the charging wait time can be selected in accordance with the temperature zone of external air at the time of charging thereby to highly accurately calculate the charging wait time for the electric vehicle 1 at the charging station 2.

Table 10 presented below is a table that lists examples of the information stored in the information storage unit 23 of the charging wait time calculation system 10 according to a third example. Table 11 presented below is a table that lists the result of calculating the estimated charging time T1 for the examples listed in Table 10.

TABLE 10

| Vehicle identification number | Rated capacity [kWh] | Time and date | Charged capacity [kWh] | Charger output [kW] | Inside/outside of home ground |
|---|---|---|---|---|---|
| AAA | 24 | 10:00 Feb. 1 | 22 | 45 | Inside |
| AAA | 24 | 10:30 Feb. 2 | 20 | 45 | Inside |
| AAA | 24 | 10:00 Feb. 5 | 18 | 45 | Inside |
| AAA | 24 | 10:00 Feb. 6 | 10 | 45 | Outside |

TABLE 11

| Vehicle identification number of vehicle waiting for charging | Rated capacity [kWh] | Average value of charged capacity [kWh] | Charger output [kW] | Estimated charging time [h] |
|---|---|---|---|---|
| AAA | 24 | 20 | 45 | 0.44 |

As listed in Table 10, in the charging wait time calculation system 10 of the present example, each time one charging is completed, the information storage unit 23 stores information on an area of the charging station 2 at which the charging is performed, the charged capacity information, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14.

The information on an area of the charging station 2 at which the charging is performed is information as to whether the charging station 2 is a station existing inside an area with a high usage frequency (referred to as a "home ground," hereinafter) or a station existing outside the home ground. The range of the home ground is defined, for example, as a range of a radius of 10 km around the charging station 2 having the highest usage frequency. Positional information of the charging station 2 is acquired through the global positioning system (GPS).

When the charging station 2 for which the calculation process for the charging wait time is executed in the charging wait time calculation system 10 of the present example is located inside the home ground, the information extraction unit 24 extracts only the information on the inside of the home ground stored in the information storage unit 23. On the other hand, when the charging station 2 for which the calculation process for the charging wait time is executed in the charging wait time calculation system 10 is located outside the home ground, the information extraction unit 24 extracts only the information on the outside of the home ground stored in the information storage unit 23.

For example, in the charging wait time calculation system 10, when the charging station 2 at which the electric vehicle 1 of the vehicle identification number AAA is waiting for charging is located inside the home ground, the information extraction unit 24 extracts information on the three times of charging, which is carried out at the charging station 2 located inside the home ground, from information on the four times of charging of the vehicle identification number AAA stored in the information storage unit 23. The charging wait time calculation unit 25 calculates the estimated charging time T1 for the electric vehicle 1 of the vehicle identification number AAA on the basis of the information on the three times of charging extracted by the information extraction unit 24.

As described above, in the charging wait time calculation system 10 of the present example, each time the charging of an electric vehicle 1 is executed at the charging station 2, the information storage unit 23 stores the charged capacity information, the information on an area of the charging station 2 at which the charging is performed (in the present example, information as to whether the charging station 2 is located inside the home ground or outside the home ground), and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charged capacity information, which corresponds to the acquired identification information of the electric vehicle 1 waiting for charging and in which the area of the charging station 2 is identical, from the charged capacity information in past times stored in the information storage unit 23, and calculating the charging wait time at the charging station 2 as the calculation object on the basis of the extracted charged capacity information. Here, the tendency of past charging of the electric vehicle 1 differs in accordance with the area of the charging station 2. For example, the tendency of the capacity charged by one charging of the electric vehicle 1 differs between inside of the home ground and outside of the home ground. Thus, the charged capacity information in past times to be used for the calculation process for the charging wait time can be selected in accordance with the area of the charging station 2 thereby to highly accurately calculate the charging wait time for the electric vehicle 1 at the charging station 2.

Table 12 presented below is a table that lists the information stored in the information storage unit 23 of the charging wait time calculation system 10 according to a fourth example. Table 13 presented below is a table that lists the result of calculating the estimated charging time T1 for the examples listed in Table 12.

TABLE 12

| Vehicle identification number | Rated capacity [kWh] | Time and date | Charged capacity [kWh] | Charger output [kW] | Weekday/Holiday | External temperature when starting charging [C.°] | Inside/outside of home ground |
|---|---|---|---|---|---|---|---|
| AAA | 24 | 10:00 Feb. 1 | 22 | 45 | Weekday | 20 | Inside |
| AAA | 24 | 10:30 Feb. 2 | 20 | 45 | Weekday | 23 | Inside |
| AAA | 24 | 10:00 Feb. 5 | 18 | 45 | Weekday | 22 | Inside |
| AAA | 24 | 10:00 Feb. 6 | 10 | 45 | Weekday | 26 | Outside |

TABLE 13

| Vehicle identification number of vehicle waiting for charging | Rated capacity [kWh] | Average value of charged capacity [kWh] | Charger output [kW] | Estimated charging time [h] |
|---|---|---|---|---|
| AAA | 24 | 20 | 45 | 0.44 |

As listed in Table 12, in the charging wait time calculation system 10 of the present example, each time one charging is completed, the information storage unit 23 stores information as to whether the date on which the electric vehicle 1 is charged is a weekday or a holiday, information on the external temperature when starting the charging of the electric vehicle 1, information on an area of the charging station 2 at which the charging is performed, the charged capacity information, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14. The information as to whether the date on which the electric vehicle 1 is charged is a weekday or a holiday is the same as that described in the first example and will be referred to as "first classification information," hereinafter. The information on the external temperature when starting the charging of the electric vehicle 1 is the same as that described in the second example and will be referred to as "second classification information," hereinafter. The information on an area of the charging station 2 at which the charging is performed is the same as that described in the third example and will be referred to as "third classification information," hereinafter.

In the charging wait time calculation system 10 of the present example, the information extraction unit 24 extracts only information corresponding to the first to third classification information from the information stored in the information storage unit 23. For example, when the date on which the calculation process for the estimated charging time T1 for the electric vehicle 1 of the vehicle identification number AAA is executed in the charging wait time calculation system 10 is a weekday, the external temperature [° C.] at the time of executing the calculation process is 20° C., and the charging station 2 as the object of the calculation process is located within the home ground, the information extraction unit 24 extracts information on the three times of charging, which corresponds to weekdays, external temperatures corresponding to the category B, and charging stations 2 located inside the home ground, from information on the four times of charging of the electric vehicle 1 with the vehicle identification number AAA stored in the information storage unit 23. The charging wait time calculation unit 25 calculates the estimated charging time T1 for the electric vehicle 1 of the vehicle identification number AAA on the basis of the information on the three times of charging extracted by the information extraction unit 24.

As described above, in the charging wait time calculation system 10 of the present embodiment, each time the charging of an electric vehicle 1 is executed at the charging station 2, the information storage unit 23 stores the charged capacity information, the information on the classification of the date on which the charging is executed (in the present example, information as to whether the date is a weekday or a holiday), the information on the temperature zone of external air when starting the charging, the information on an area of the charging station 2 at which the charging is performed (in the present example, information as to whether the charging station 2 is located inside the home ground or outside the home ground), and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charged capacity information, which corresponds to the identification information of the electric vehicle 1 waiting for charging, corresponds to the classification of the date on which the charging is performed, corresponds to the temperature zone of external air at the time of calculation, and corresponds to the area of the charging station 2 as the calculation object, from the charged capacity information in past times stored in the information storage unit 23, and calculating the charging wait time at the charging station 2 as the calculation object on the basis of the extracted charged capacity information. Thus, the charging wait time for the electric vehicle 1 at the charging station 2 can be calculated with a high degree of accuracy.

Figure 3:
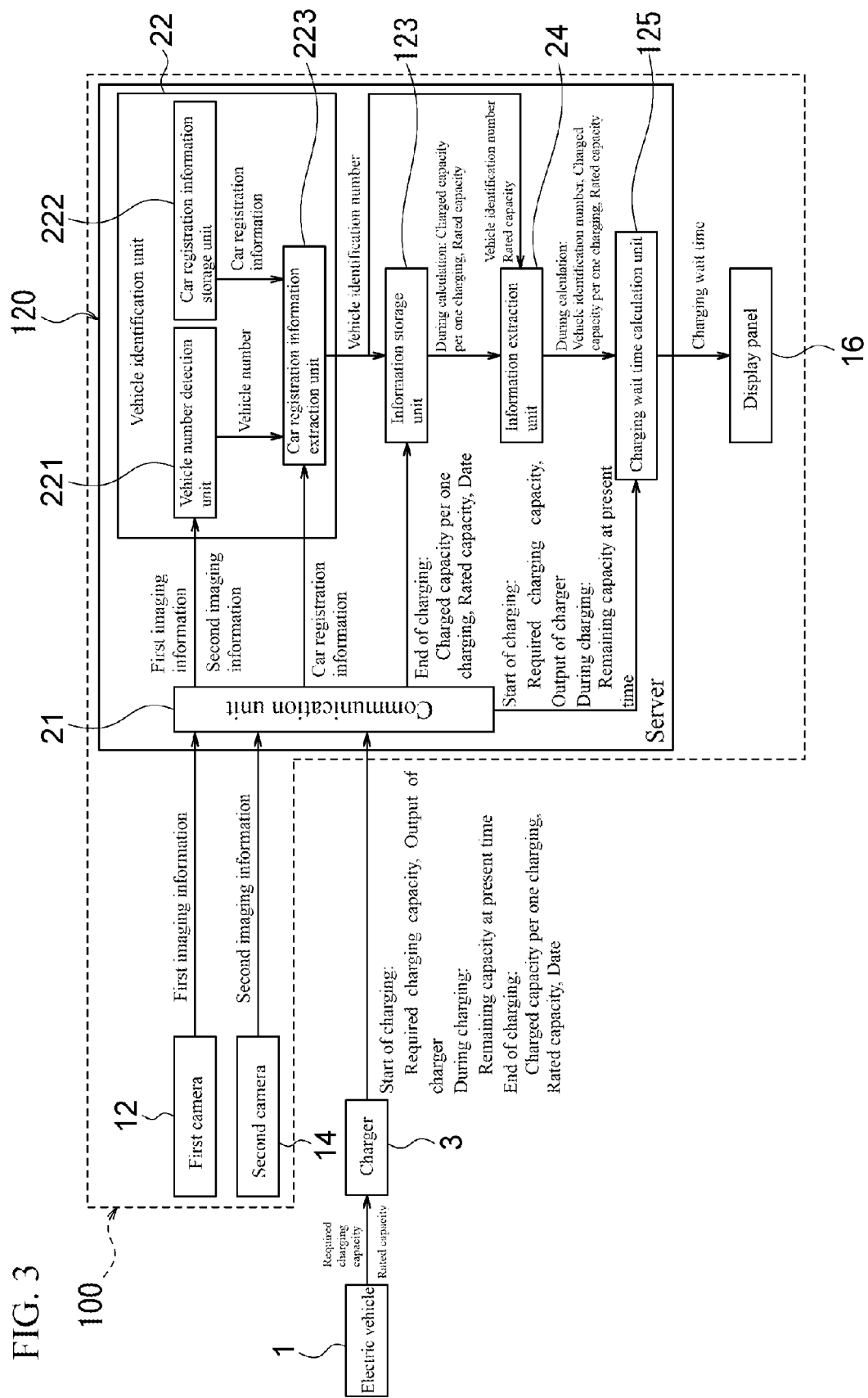
FIG. 3 is a block diagram illustrating a charging wait time calculation system according to a second embodiment of the present invention.

FIG. 3 is a block diagram illustrating the overview of a charging wait time calculation system 10 according to a second embodiment. As illustrated in the figure, the charging wait time calculation system 100 includes a server 120. The server 120 comprises a communication unit 21, a vehicle identification unit 22, an information storage unit 123, an information extraction unit 24, and a charging wait time calculation unit 125. Functions of the communication unit 21, vehicle identification unit 22, and information extraction unit 24 are as described in the above first embodiment, and the description will be omitted in the present embodiment.

In the charging wait time calculation system 10 according to the above-described first embodiment, each time one charging is completed, the information storage unit 23 stores the information on the charged capacity, whereas in the charging wait time calculation system 100 according to the present embodiment, each time one charging is completed, the information storage unit 123 stores information on the time required for charging (referred to as "charging time information," hereinafter). That is, each time one charging is completed, the information storage unit 123 stores the charging time information, the information on the rated capacity of the charged battery of the electric vehicle 1, the information on the output of the charger 3, and the information on the time and date, which are received from the charger 3 via the communication unit 21, in association with the vehicle identification number of the electric vehicle 1 identified by the vehicle identification unit 22 from the imaging information of the second camera 14.

Table 14 presented below is a table that lists examples of the information stored in the information storage unit 123. Table 15 is a table that lists the results of calculating the estimated charging time T1 for the examples listed in Table 14.

TABLE 14

| Vehicle identification number | Rated capacity [kWh] | Time and date | Charging time [h] |
| --- | --- | --- | --- |
| AAA | 12 | 10:00 Jan. 1 | 0.5 |
| AAA | 12 | 10:30 Jan. 2 | 0.3 |
| BBB | 24 | 10:00 Jan. 2 | 0.2 |
| BBB | 24 | 12:00 Jan. 3 | 0.4 |

TABLE 15

| Vehicle identification number of vehicle waiting for charging | Rated capacity [kWh] | Estimated charging time [h] |
| --- | --- | --- |
| AAA | 12 | 0.4 |
| BBB | 24 | 0.3 |

The charging wait time calculation unit 125 calculates the average value of the charging times [h] that are stored in the information storage unit 123 and extracted by the information extraction unit 24. For example, as listed in Table 14, when the electric vehicle 1 having a vehicle identification number AAA was charged twice in past times and respective charging times were 0.5 [h] and 0.3 [h], the estimated charging time T1 [h] of the electric vehicle 1 is 0.4 [h], as listed in Table 15. Likewise, as listed in Table 14, when the electric vehicle 1 having a vehicle identification number BBB was charged twice in past times and respective charging times were 0.2 [h] and 0.4 [h], the estimated charging time T1 [h] of the electric vehicle 1 is 0.3 [h], as listed in Table 15. In an alternative embodiment, the estimated charging time [h] may be a median value, a mode value, a latest value, or other available value as substitute for the average value of the values stored in the information storage unit 123.

Then, the charging wait time calculation unit 125 calculates a charging wait time T3 for each charger 3 in accordance with the following formulae (4) and (5). The following formula (4) is an equation for calculating a remaining charging time T2 for the electric vehicle 1 being charged.

$$T2=(\text{Required charging capacity [kWh]}-\text{Remaining capacity [kWh]})\div\text{Charger output [kW]} \quad (4)$$

The remaining capacity [kWh] is a charged capacity that remains in the battery at the time of calculating the remaining charging time T2.

The following formula (5) is an equation for calculating the charging wait time T3 for each charger 3. That is, the charging wait time T3 for each charger 3 is obtained by adding the sum of estimated charging times T1 calculated by the above formula (1) for the electric vehicles 1 waiting for charging to the remaining charging time T2 calculated by the above formula (2) for the electric vehicle 1 being charged.

$$T3=\Sigma T1+T2 \quad (5)$$

For example, when the required charging capacity [kWh] for the electric vehicle 1 being charged is 30 kWh, the remaining capacity [kWh] of the electrical vehicle 1 being charged is 10 kWh, the output of the charger 3 is 40 kW, and two electric vehicles 1 of the vehicle identification numbers AAA and BBB listed in Table 15 are waiting for charging, the charging wait time T3 is as follows.

$$\Sigma T1=0.4+0.3=0.7 \text{ [h]}$$

$$T2=(30-10)\div40=0.5 \text{ [h]}$$

$$T3=0.7+0.5=1.2 \text{ [h]}$$

Here, when the information storage unit 123 stores the vehicle identification number which is identified by the vehicle identification unit 22 from the imaging information of the first camera 12, the charging wait time calculation unit 125 calculates the charging wait time T3 on the basis of the information stored in the information storage unit 123 in association with the vehicle identification number. On the other hand, when the information storage unit 123 does not store the vehicle identification number which is identified by the vehicle identification unit 22 from the imaging information of the first camera 12, the information extraction unit 24 extracts, from the information storage unit 123, information on another electric vehicle 1 of which the battery rated capacity is the same as that of the electric vehicle 1 having the vehicle identification number, and the charging wait time calculation unit 125 calculates the charging wait time T3 on the basis of the information on the other electric vehicle 1 extracted by the information extraction unit 24.

Table 16 presented below is a table that lists examples of the information stored in the information storage unit 123.

Table 17 presented below is a table that lists the results of calculating the estimated charging time T1 for the examples listed in Table 16.

TABLE 16

| Vehicle identification number | Rated capacity [kWh] | Time and date | Charging time [h] |
| --- | --- | --- | --- |
| AAA | 24 | 10:00 Jan. 1 | 0.2 |
| AAA | 24 | 10:30 Jan. 2 | 0.3 |
| BBB | 12 | 10:00 Jan. 2 | 0.4 |
| BBB | 12 | 10:00 Jan. 4 | 0.5 |
| BBB | 12 | 10:00 Jan. 5 | 0.2 |
| BBB | 12 | 10:00 Jan. 6 | 0.5 |
| CCC | 24 | 11:00 Jan. 2 | 0.3 |
| CCC | 24 | 12:00 Jan. 3 | 0.4 |

TABLE 17

| Vehicle identification number of vehicle waiting for charging | Rated capacity [kWh] | Estimated charging time [h] |
| --- | --- | --- |
| AAA | 24 | 0.25 |
| BBB | 12 | 0.4 |
| CCC | 24 | 0.35 |
| DDD | 24 | 0.3 |

For example, when the vehicle identification number identified by the vehicle identification unit 22 from the imaging information of the first camera 12 is DDD, the information extraction unit 24 extracts, from the information storage unit 123, information on other electric vehicles 1 (vehicle identification number AAA and vehicle identification number BBB) of which the battery rated capacity (24 [kWh]) is the same as that of the electric vehicle 1 having the vehicle identification number DDD. Then, the charging wait time calculation unit 125 calculates the average value (0.3 [h]) of the charging times [h] for the vehicle identification numbers AAA and CCC stored in the information storage unit 123, as the estimated charging time T1.

With regard to the charging wait time T3, for example, when the required charging capacity [kWh] for the electric vehicle 1 being charged is 30 kWh, the remaining capacity [kWh] of the electrical vehicle 1 being charged is 10 kWh, the output of the charger 3 is 40 kW, and two electric vehicles 1 of the vehicle identification numbers AAA and DDD are waiting for charging, the charging wait time T3 is as follows.

$$\Sigma T1=0.25+0.3=0.55 \text{ [h]}$$

$$T2=(30-10)\div40=0.5 \text{ [h]}$$

$$T3=0.55+0.5=1.05 \text{ [h]}$$

The charging wait time calculation system 100 of the present embodiment is configured and operates as described above; therefore, the following effects are obtained.

(1) According to the charging wait time calculation system 100 of the present embodiment, each time the charging of an electric vehicle 1 is executed at the charging station 2, the charging time information is acquired, the identification information of the electric vehicle 1 is acquired, and the acquired charging time information and the acquired identification information of the electric vehicle 1 are stored in the information storage unit 123 so as to be associated with each other. Here, the charging time information can be acquired from the charger 3. The identification information of the electric vehicle 1 can be acquired through analyzing the imaging information of the second camera 14 to detect the vehicle number and crosschecking the vehicle number and the car registration information. Then, the identification information of the electric vehicle 1 is acquired which is waiting for charging at the charging station 2 as a calculation object for which the charging wait time is calculated, the charging time information corresponding to the identification information of the electric vehicle 1 waiting for charging is extracted from the past charging time information stored in the information storage unit 123, and the charging wait time at the charging station 2 as the calculation object is calculated on the basis of the extracted charging time information. Here, the identification information of the electric vehicle 1 waiting for charging can be acquired through analyzing the imaging information of the first camera 12 to detect the vehicle number and crosschecking the vehicle number and the car registration information. Thus, the charging wait time for the electric vehicle 1 at the charging station 2 can be calculated while reducing the cost for equipping the electric vehicle 1 with a dedicated onboard device for collecting information, such as a rated capacity and a remaining capacity of the battery of the electric vehicle 1 waiting for charging.

(2) According to the charging wait time calculation system 100 of the present embodiment, the charging time information is organized for each electric vehicle 1 and stored in the information storage unit 123, and the charging wait time for the electric vehicle 1 at the charging station 2 is calculated using such charging time information. That is, the charging wait time for the electric vehicle 1 at the charging station 2 is calculated on the basis of the tendency of charging in past times of each electric vehicle 1 waiting for charging. Here, a certain tendency appears in the past charging of the electric vehicle 1 in accordance with the environment in which the electric vehicle 1 is used. For example, a certain tendency appears in the time required for one charging in accordance with the distance between the parking lot for the electric vehicle 1 and a neighboring charging station 2. The charging wait time for the electric vehicle 1 at the charging station 2 can therefore be calculated with a sufficient degree of accuracy while reducing the cost for equipping the electric vehicle 1 with the above-described dedicated onboard device.

(3) According to the charging wait time calculation system 100 of the present embodiment, the charging wait time for the electric vehicle 1 at the charging station 2 is calculated on the basis of the average value of the charging times extracted from the information storage unit 123. That is, the charging wait time for the electric vehicle 1 at the charging station 2 is calculated using a value obtained by further averaging the past charging times in which a certain tendency appears. The charging wait time for the electric vehicle 1 at the charging station 2 can therefore be calculated with a sufficient degree of accuracy while reducing the cost for equipping the electric vehicle 1 with the above-described dedicated onboard device.

(4) In the charging wait time calculation system 10 of the present embodiment, each time the charging of an electric vehicle 1 is executed at the charging station 2, information on the rated capacity of the battery of the electric vehicle 1 is stored in the information storage unit 123 in addition to the above charging time information so as to be associated with the identification information of the electric vehicle 1. Here, the information on the rated capacity of the battery can be acquired by crosschecking the car registration information therewith. Then, when the charging time information corresponding to the identification information of the electric vehicle 1 waiting for charging is not stored in the information storage unit 123, the charging time information of another electric vehicle 1 of which the rated capacity of the battery is the same as that of the electric vehicle 1 is extracted from the information storage unit 123 and used for calculation of the charging wait time. Thus, even when electric vehicles 1 waiting for charging include an electric vehicle 1 of which the charging history is not stored in the information storage unit 123, the charging wait time can be calculated so as to include the charging time for that electric vehicle 1.

Table 18 presented below is a table that lists examples of the information stored in the information storage unit 123 of the charging wait time calculation system 10 according to a fifth example. Table 19 presented below is a table that lists the result of calculating the estimated charging time T1 for the examples listed in Table 18.

TABLE 18

| Vehicle identification number | Rated capacity [kWh] | Time and date | Charging time [h] | Weekday/ Holiday |
| --- | --- | --- | --- | --- |
| AAA | 24 | 10:00 Feb. 1 | 0.1 | Weekday |
| AAA | 24 | 10:30 Feb. 2 | 0.6 | Weekday |
| AAA | 24 | 10:00 Feb. 5 | 0.2 | Weekday |
| AAA | 24 | 10:00 Feb. 6 | 0.3 | Holiday |

TABLE 19

| Vehicle identification number of vehicle waiting for charging | Rated capacity [kWh] | Estimated charging time [h] |
| --- | --- | --- |
| AAA | 24 | 0.3 |

As listed in Table 18, in the charging wait time calculation system 100 of the present example, each time one charging is completed, the information storage unit 123 stores information as to whether the date on which the electric vehicle 1 is charged is a weekday or a holiday, the charging time information, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14.

When the calculation process for the charging wait time is executed on a weekday in the charging waiting time calculation system 100, the information extraction unit 24 extracts only the weekday information stored in the information storage unit 123. On the other hand, when the calculation process for the charging wait time T3 is executed on a holiday in the charging wait time calculation system 100, the information extraction unit 24 extracts only the holiday information stored in the information storage unit 123.

For example, when the calculation process for the estimated charging time T1 for the electric vehicle 1 of the vehicle identification number AAA is executed on a weekday in the charging wait time calculation system 100, the information extraction unit 24 extracts information on the three times of charging carried out on weekdays from information on the four times of charging of the vehicle identification number AAA stored in the information storage unit 123. The charging wait time calculation unit 125 calculates the estimated charging time T1 for the electric vehicle 1 of the vehicle identification number AAA on the basis of the information on the three times of charging extracted by the information extraction unit 24.

As described above, in the charging wait time calculation system 100 of the present example, each time the charging of an electric vehicle 1 is executed at the charging station 2, the information storage unit 123 stores the charging time information, the information on the classification of the date on which the charging is executed (in the present example, information as to whether the date is a weekday or a holiday), and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charging time information, which corresponds to the identification information of the electric vehicle 1 waiting for charging and corresponds to the classification of the date on which the charging wait time is calculated, from the charging time information in past times stored in the information storage unit 123, and calculating the charging wait time at the charging station 2 as the calculation object on the basis of the extracted charging time information. Here, the tendency of past charging of the electric vehicle 1 differs in accordance with the classification of the date on which charging is performed. For example, the tendency of the time required for one charging differs between a weekday and a holiday. Thus, the charging time information in past times to be used for the calculation process for the charging wait time can be selected in accordance with the classification of the date on which charging is performed, thereby to highly accurately calculate the charging wait time for the electric vehicle 1 at the charging station 2.

Table 20 presented below is a table that lists examples of the information stored in the information storage unit 123 of the charging wait time calculation system 100 according to a sixth example. Table 21 presented below is a table that lists the result of calculating the estimated charging time T1 for the examples listed in Table 20.

TABLE 20

| Vehicle identification number | Rated capacity [kWh] | Time and date | Charging time [h] | External temperature when starting charging [C. °] |
|---|---|---|---|---|
| AAA | 24 | 10:00 Feb. 1 | 0.1 | 20 |
| AAA | 24 | 10:30 Feb. 2 | 0.6 | 23 |
| AAA | 24 | 10:00 Feb. 5 | 0.2 | 22 |
| AAA | 24 | 10:00 Feb. 6 | 0.3 | 26 |

TABLE 21

| Vehicle identification number of vehicle waiting for charging | Rated capacity [kWh] | Estimated charging time [h] |
|---|---|---|
| AAA | 24 | 0.3 |

As listed in Table 20, in the charging wait time calculation system 100 of the present example, each time one charging is completed, the information storage unit 123 stores information on the external temperature when starting the charging of the electric vehicle 1, information on the charging time for one charging, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14.

In the charging wait time calculation system 100 of the present example, the information extraction unit 24 extracts the information stored in the information storage unit 123 in accordance with the external temperature [° C.] when executing the calculation process for the charging wait time T3. Table 22 presented below is a table in which the external temperature [° C.] when executing the calculation process for the charging wait time T3 and the external temperature [° C.] when starting the charging of the electric vehicle 1 are classified into categories A, B, C, and D.

TABLE 22

| Category | External temperature [° C.] when starting charging |
|---|---|
| A | Lower than 10° C. |
| B | 10° C. or higher and lower than 25° C. |
| C | 25° C. or higher and lower than 30° C. |
| D | 30° C. or higher |

As listed in this table, the category A corresponds to a case in which the external temperature [° C.] is lower than 10° C., the category B corresponds to a case in which the external temperature [° C.] is 10° C. or higher and lower than 25° C., the category C corresponds to a case in which the external temperature [° C.] is 25° C. or higher and lower than 30° C., and the category D corresponds to a case in which the external temperature [° C.] is 30° C. or higher.

In the charging wait time calculation system 100 of the present example, the information extraction unit 24 extracts only the information on the corresponding category from the information stored in the information storage unit 123. For example, when the external temperature [° C.] is 20° C., the information extraction unit 24 extracts information on the three times of charging, which corresponds to the category B, from information on the four times of charging of the vehicle identification number AAA stored in the information storage unit 123. The charging wait time calculation unit 125 calculates the estimated charging time T1 for the electric vehicle 1 of the vehicle identification number AAA on the basis of the information on the three times of charging extracted by the information extraction unit 24.

As described above, in the charging wait time calculation system 100 of the present example, each time the charging of an electric vehicle 1 is executed at the charging station 2, the information storage unit 123 stores the acquired charging time information, the information on the temperature zone of external air when starting the charging, and the acquired identification information of the electric vehicle 1 so that these information items are associated with one another. This process is followed by acquiring the identification information of the electric vehicle 1 waiting for charging at the charging station 2 as the calculation object, extracting the charging time information, which corresponds to the identification information of the electric vehicle 1 waiting for charging and in which the temperature zone of external air is identical with that when calculating the charging wait time, from the charging time information in past times stored in the information storage unit 123, and calculating the charging wait time at the charging station 2 as the calculation object on the basis of the extracted charging time information. Here, the tendency of past charging differs in accordance with the temperature zone of external air. Thus, the charging time information in past times to be used for the calculation process for the charging wait time can be selected in accordance with the temperature zone of external air at the time of charging thereby to highly accurately calculate the charging wait time for the electric vehicle 1 at the charging station 2.

Table 23 presented below is a table that lists examples of the information stored in the information storage unit 123 of the charging wait time calculation system 100 according to a seventh example. Table 24 presented below is a table that lists the result of calculating the estimated charging time T1 for the examples listed in Table 23.

TABLE 23

| Vehicle identification number | Rated capacity [kWh] | Time and date | Charging time [h] | Inside/ outside of home ground |
|---|---|---|---|---|
| AAA | 24 | 10:00 Feb. 1 | 0.1 | Inside |
| AAA | 24 | 10:30 Feb. 2 | 0.6 | Inside |
| AAA | 24 | 10:00 Feb. 5 | 0.2 | Inside |
| AAA | 24 | 10:00 Feb. 6 | 0.3 | Outside |

TABLE 24

| Vehicle identification number of vehicle waiting for charging | Rated capacity [kWh] | Estimated charging time [h] |
|---|---|---|
| AAA | 24 | 0.3 |

As listed in Table 23, in the charging wait time calculation system 100 of the present example, each time one charging is completed, the information storage unit 123 stores information on an area of the charging station 2 at which the charging is performed, the charging time information, information on the rated capacity of the charged battery of the electric vehicle 1, information on the output of the charger 3, and information on the time and date so that these information items are associated with the vehicle identification number of the electric vehicle 1 identified by the vehicle identification unit 22 from the imaging information of the second camera 14.

The information on an area of the charging station 2 at which the charging is performed is information as to whether the charging station 2 is a station existing inside an area with a high usage frequency (referred to as a "home ground," hereinafter) or a station existing outside the home ground. The range of the home ground is defined, for example, as a range of a radius of 10 km around the charging station 2 having the highest usage frequency. Positional information of the charging station 2 is acquired through the global positioning system (GPS).

When the charging station 2 as the calculation object for which the charging wait time is calculated in the charging wait time calculation system 100 of the present example is located inside the home ground, the information extraction unit 24 extracts only the information on the inside of the home ground stored in the information storage unit 123. On the other hand, when the charging station 2 as the calculation object for which the charging wait time is calculated in the charging wait time calculation system 10 is located outside the home ground, the information extraction unit 24 extracts only the information on the outside of the home ground stored in the information storage unit 123.

For example, in the charging wait time calculation system 100, when the charging station 2 at which the electric vehicle 1 of the vehicle identification number AAA is waiting for charging is located inside the home ground, the information extraction unit 24 extracts information on the three times of charging, which is carried out at the charging station 2 located inside the home ground, from information on the four times of charging of the vehicle identification number AAA stored in the information storage unit 123. The charging wait time calculation unit 125 calculates the estimated charging time T1 for the electric vehicle 1 of the vehicle identification number AAA on the basis of the information on the three times of charging extracted by the information extraction unit 24.

As described above, in the charging wait time calculation system 100 of the present example, each time the charging of an electric vehicle 1 is executed at the charging station 2, the information storage unit 123 stores the charging time information, the information on an area of the charging station 2 at which the charging is performed (in the present example, information as to whether the charging station 2 is located inside the home ground or outside the home ground), and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charging time information, which corresponds to the identification information of the electric vehicle 1 waiting for charging and corresponds to the area of the charging station 2 as the calculation object, from the charging time information in past times stored in the information storage unit 123, and calculating the charging wait time at the charging station 2 as the calculation object on the basis of the extracted charging time information. Here, the tendency of past charging of the electric vehicle 1 differs in accordance with the area of the charging station 2. For example, the tendency of the time required for one charging differs between inside of the home ground and outside of the home ground. Thus, the charging time information in past times to be used for the calculation process for the charging wait time can be selected in accordance with the area of the charging station 2 thereby to highly accurately calculate the charging wait time for the electric vehicle 1 at the charging station 2.

Table 25 presented below is a table that lists examples of the information stored in the information storage unit 123 of the charging wait time calculation system 100 according to an eighth example. Table 26 presented below is a table that lists the result of calculating the estimated charging time T1 for the examples listed in Table 25.

TABLE 25

| Vehicle identification number | Rated capacity [kWh] | Time and date | Charging time [h] | Charger output [kW] |
|---|---|---|---|---|
| AAA | 24 | 10:00 Feb. 1 | 0.1 | 45 |
| AAA | 24 | 10:30 Feb. 2 | 0.6 | 45 |
| AAA | 24 | 10:00 Feb. 5 | 0.2 | 45 |
| AAA | 24 | 10:00 Feb. 6 | 0.3 | 20 |

TABLE 26

| Vehicle identification number of vehicle waiting for charging | Rated capacity [kWh] | Estimated charging time [h] |
|---|---|---|
| AAA | 24 | 0.3 |

As listed in Table 25, in the charging wait time calculation system 100 of the present example, each time one charging is completed, the information storage unit 123 stores information on the output of the charger 3 with which the charging is performed, the charging time information, information on the rated capacity of the charged battery of the electric vehicle 1, and information on the time and date so that these information items are associated with the vehicle identification number of the electric vehicle 1 identified by the vehicle identification unit 22 from the imaging information of the second camera 14.

In the charging wait time calculation system 100 of the present example, when the output of the charger 3 waiting for charging is 45 [kW], the information extraction unit 24 extracts only the information on the chargers 3 of output of 45 [kW] stored in the information storage unit 123. On the other hand, when the output of the charger 3 as the calculation object for which the charging wait time T3 is calculated in the charging wait time calculation system 100 is 20 [kW], the information extraction unit 24 extracts only the information on the charger 3 of output of 20 [kW] stored in the information storage unit 123.

For example, in the charging wait time calculation system 100, when the output of the charger 3 as the calculation object for which the estimated charging time T1 for the electric vehicle 1 of the vehicle identification number AAA is calculated is 45 [kW], the information extraction unit 24 extracts information on the three times of charging, which is carried out by the chargers 3 of output of 45 [kW], from information on the four times of charging of the vehicle identification number AAA stored in the information storage unit 123. The charging wait time calculation unit 125 calculates the estimated charging time T1 for the electric vehicle 1 of the vehicle identification number AAA on the basis of the information on the three times of charging extracted by the information extraction unit 24.

As described above, in the charging wait time calculation system 100 of the present example, each time the charging of an electric vehicle 1 is executed at the charging station 2, the information storage unit 123 stores the charging time information, the information on the output of the charger 3 with which the charging is executed, and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charging time information, which corresponds to the identification information of the electric vehicle 1 waiting for charging and in which the output of the charger 3 waiting for charging is the same, from the charging time information in past times stored in the information storage unit 123, and calculating the charging wait time at the charger 3 on the basis of the extracted charging time information. Here, the tendency of the time required for one charging of the electric vehicle 1 differs in accordance with the output of the charger 3. Thus, the charging time information in past times to be used for the calculation process for the charging wait time can be selected in accordance with the output of the charger 3 thereby to highly accurately calculate the charging wait time for the electric vehicle 1 at the charging station 2.

Table 27 presented below is a table that lists examples of the information stored in the information storage unit 123 of the charging wait time calculation system 100 according to a ninth example. Table 28 presented below is a table that lists the result of calculating the estimated charging time T1 for the examples listed in Table 27.

TABLE 27

| Vehicle identification number | Rated capacity [kWh] | Time and date | Charging time [h] | Weekday/Holiday | External temperature when starting charging [C.°] | Inside/outside of home ground | Charger output [kW] |
| --- | --- | --- | --- | --- | --- | --- | --- |
| AAA | 24 | 10:00 Feb. 1 | 0.1 | Weekday | 20 | Inside | 45 |
| AAA | 24 | 10:30 Feb. 2 | 0.6 | Weekday | 23 | Inside | 45 |
| AAA | 24 | 10:00 Feb. 5 | 0.2 | Weekday | 22 | Inside | 45 |
| AAA | 24 | 10:00 Feb. 6 | 0.3 | Weekday | 26 | Outside | 20 |

TABLE 28

| Vehicle identification number of vehicle waiting for charging | Rated capacity [kWh] | Estimated charging time [h] |
| --- | --- | --- |
| AAA | 24 | 0.3 |

As listed in Table 27, in the charging wait time calculation system 100 of the present example, each time one charging is completed, the information storage unit 23 stores information as to whether the date on which the electric vehicle 1 is charged is a weekday or a holiday, information on the external temperature when starting the charging of the electric vehicle 1, information on an area of the charging station 2 at which the charging is performed, information on the output of the charger 3, the charging time information, information on the rated capacity of the charged battery of the electric vehicle 1, and information on the time and date so that these information items are associated with the vehicle identification number of the electric vehicle 1 identified by the vehicle identification unit 22 from the imaging information of the second camera 14. The information as to whether the date on which the electric vehicle 1 is charged is a weekday or a holiday is the same as that in the fifth example and will be referred to as "first classification information," hereinafter. The information on the external temperature when starting the charging of the electric vehicle 1 is the same as that in the sixth example and will be referred to as "second classification information," hereinafter. The information on an area of the charging station 2 at which the charging is performed is the same as that in the seventh example and will be referred to as "third classification information," hereinafter. The information on the output of the charger 3 is the same as that in the eighth example and will be referred to as "fourth classification information," hereinafter.

In the charging wait time calculation system 100 of the present example, the information extraction unit 24 extracts only information corresponding to the classification of the first to fourth classification information from the information stored in the information storage unit 123. For example, when the date on which the calculation process for the estimated charging time T1 for the electric vehicle 1 of the vehicle identification number AAA is executed in the charging wait time calculation system 100 is a weekday, the external temperature [° C.] at the time of executing the calculation process is 20° C., the charging station 2 as the object of the calculation process is located within the home ground, and the output of the charger 3 waiting for charging is 45 [kW], the information extraction unit 24 extracts information on the three times of charging, which corresponds to weekdays, external temperatures corresponding to the category B, charging stations 2 located inside the home ground, and chargers 3 of output of 45 [kW], from information on the four times of charging of the electric vehicle 1 with the vehicle identification number AAA stored in the information storage unit 123. The charging wait time calculation unit 125 calculates the estimated charging time T1 for the electric vehicle 1 of the vehicle identification number AAA on the basis of the information on the three times of charging extracted by the information extraction unit 24.

As described above, in the charging wait time calculation system 100 of the present example, each time the charging of an electric vehicle 1 is executed at the charging station 2, the information storage unit 123 stores the acquired charging time information, the information on the classification of the date on which the charging is executed (in the present example, information as to whether the date is a weekday or a holiday), the information on the temperature zone of external air when starting the charging, the information on an area of the charging station 2 at which the charging is performed (in the present example, information as to whether the charging station 2 is located inside the home ground or outside the home ground), the information on the output of the charger 3, and the identification information of the electric vehicle 1 so that these information items are associated with one another. This process is followed by acquiring the identification information of the electric vehicle 1 waiting for charging at the charging station 2 as the calculation object for which the charging wait time is calculated, extracting the charging time information, which corresponds to the identification information of the electric vehicle 1 waiting for charging, corresponds to the classification of the date on which the charging is performed, corresponds to the temperature zone of external air at the time of calculation, corresponds to the area of the charging station 2 as the calculation object, and corresponds to the output of the charger 3 waiting for charging, from the charging time information in past times stored in the information storage unit 123, and calculating the charging wait time at the charging station 2 as the calculation object on the basis of the extracted charging time information. Thus, the charging wait time for the electric vehicle 1 at the charging station 2 can be calculated with a high degree of accuracy.

In the charging wait time calculation system 100 of the present example, the information storage unit 123 stores the information on the classification of the date on which the charging is executed, the information on the temperature zone of external air when starting the charging, the information on an area of the charging station at which the charging is performed, and the information on the output of the charger 3 used, and the charging wait time for the electric vehicle 1 at the charging station 2 is calculated using all of these information items. However, it is not essential to store all of these information items in the information storage unit 123 and use them for calculation of the charging wait time. It suffices that at least one of the information items is stored in the information storage unit 123 and used for calculation of the charging wait time.

The above charging wait time calculation system 10, 100 corresponds to an example of the charging wait time calculation system in the present invention. The above communication unit 21 corresponds to an example of the charging information acquisition device in the present invention. The above second camera 14, communication unit 21, and vehicle identification unit 22 correspond to an example of the first identification information acquisition device in the present invention. The above information storage unit 23, 123 corresponds to an example of the information storage in the present invention. The above first camera 12, communication unit 21, and vehicle identification unit 22 correspond to an example of the second identification information acquisition device in the present invention. The above information extraction unit 24 corresponds to an example of the information extraction device in the present invention. The above charging wait time calculation unit 25, 125 corresponds to an example of the charging wait time calculator in the present invention. The first camera 12 and the second camera 14 correspond to an example of the camera in the present invention. The above vehicle number detection unit 221 corresponds to an example of the number detector in the present invention. The above car registration information storage unit 222 corresponds to an example of the identification information storage in the present invention. The above car registration information extraction unit 223 corresponds to an example of the identification information extraction device in the present invention.

Embodiments heretofore explained are described to facilitate understanding of the present invention and are not described to limit the present invention. It is therefore intended that the elements disclosed in the above embodiments include all design changes and equivalents to fall within the technical scope of the present invention.

Figure 4:
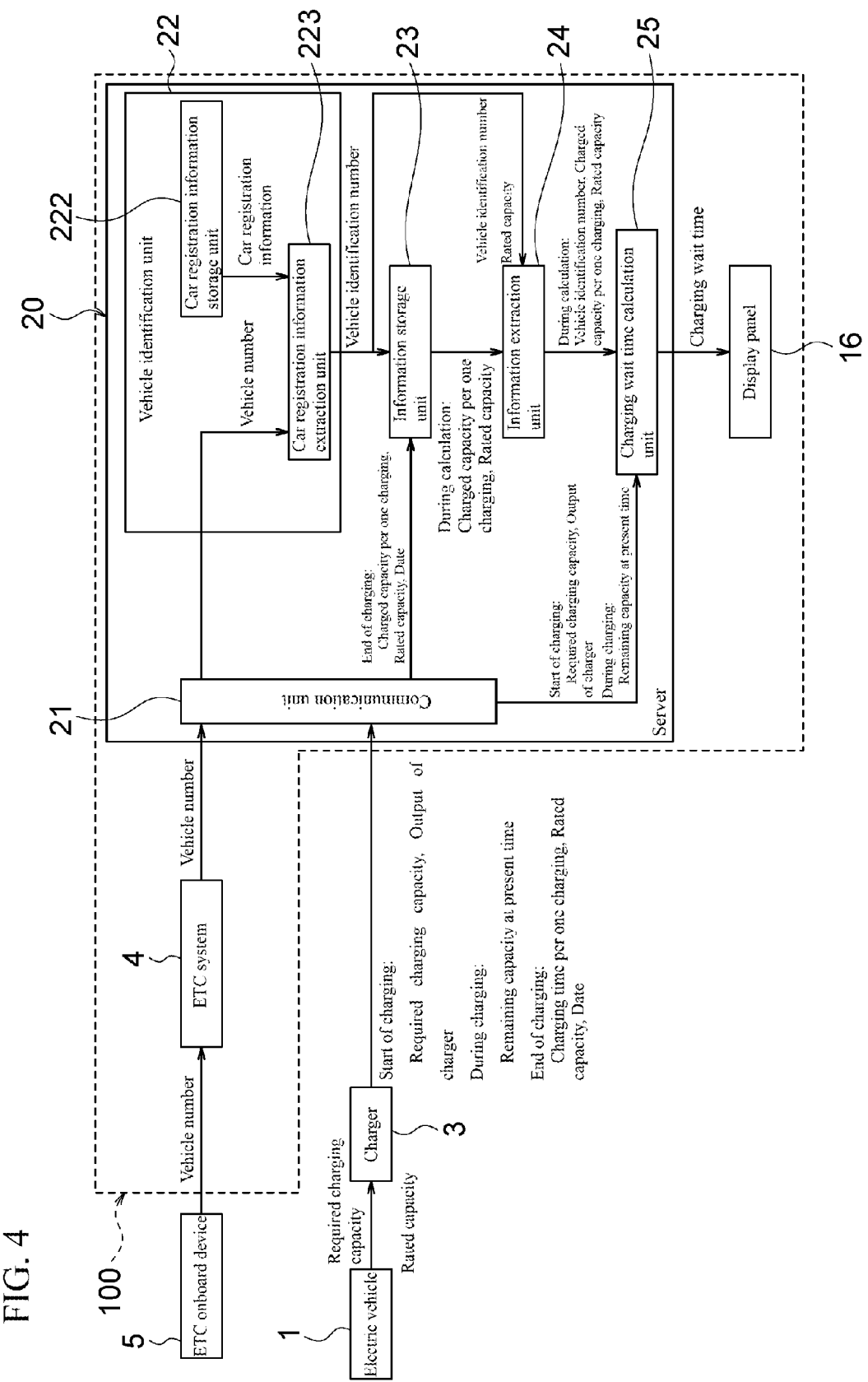
FIG. 4 is a block diagram illustrating a charging wait time calculation system according to a third embodiment of the present invention.

For example, in the above-described embodiments, the vehicle number of the electric vehicle 1 is acquired using the first and second cameras 12 and 14, but as illustrated in FIG. 4, the charging station 2 may be equipped with an ETC system 4 and the identification information of the electric vehicle 1 may be acquired from an ETC onboard device 5 equipped in the electric vehicle 1. In the above-described embodiments, the car registration information storage unit 222 preliminarily stores the car registration information including information on the rated capacity of the battery and the information on the rated capacity of the battery is acquired from the car registration information storage unit 222, but in an alternative embodiment, for example, provided that vehicle type information including information on the rated capacity of the battery is preliminarily stored in a storage unit, the vehicle type of the electric vehicle 1 may be detected from the imaging information of the first and second cameras and the rated capacity of the battery corresponding to the vehicle type may be acquired from the above storage unit.

DESCRIPTION OF REFERENCE NUMERALS

1 Electric vehicle
2 Charging station
3 Charger
4 ETC system
5 ETC onboard device
10 Charging wait time calculation system
  12 First camera 14 Second camera
16 Display panel
20 Server
  21 Communication unit
  22 Vehicle identification unit
    221 Vehicle number detection unit
    222 Car registration information storage unit
    223 Car registration information extraction unit
  23 Information storage unit
  24 Information extraction unit
  25 Charging wait time calculation unit
100 Charging wait time calculation system
120 Server
123 Information storage unit
125 Charging wait time calculation unit

The invention claimed is:

1. A charging wait time calculation system comprising:
a first camera and a second camera;
the second camera configured to acquire identification information of a first electric vehicle each time charging of the first electric vehicle is executed at a charging station;
the first camera configured to acquire identification information of one or more second electric vehicles waiting for charging at the charging station as a first calculation object for which a charging wait time for the one or more second electric vehicles is calculated;
a display panel disposed in the charging station; and
a server comprising:
  a communication device configured to acquire first charging information of the first electric vehicle each time charging is executed at the charging station, the first charging information acquired via a charger and being information regarding a charged capacity or a time required for charging;
  an information storage device in which the first charging information acquired by the communication device and the identification information acquired by the second camera are stored so as to be associated with each other;
  an information extraction device configured to extract the first charging information corresponding to the identification information by the first camera as second charging information from the stored charging information in the information storage device; and
  a charging wait time calculator configured to calculate the charging wait time at the charging station as a second calculation object on a basis of the second charging information extracted by the information extraction device, and transmit the calculated charging wait time to the display panel,
  wherein the charging wait time calculator calculates a sum of a remaining charging time for the first electric vehicle being charged at the charging station as a third calculation object and each charging time for each of the one or more second electric vehicles waiting for charging at the charging station as a fourth calculation object.

2. The charging wait time calculation system according to claim 1, wherein the charging wait time calculator calculates the charging wait time on a basis of an average value, a median value, a mode value, or a latest value of the capacity or the time included in the charging information extracted by the information extraction device.

3. The charging wait time calculation system according to claim 1, wherein,
each time charging of an electric vehicle is executed at a charging station, the information storage device is configured to store the first charging information acquired by the communication device, information on a classification of a date on which the charging is executed, and the identification information acquired by the second camera so that these information items are associated with one another, and
the information extraction device is configured to extract the second charging information from the stored charging information in the information storage device, wherein the second charging information corresponds to the identification information acquired by the first camera and corresponds to the classification of a date on which the charging wait time is calculated.

4. The charging wait time calculation system according to claim 1, wherein,
each time charging of an electric vehicle is executed at a charging station, the information storage device is configured to store the first charging information acquired by the communication device, information on a temperature zone of external air when executing the charging, and the identification information acquired by the second camera so that these information items are associated with one another, and the information extraction device is configured to extract the second charging information from the stored charging information in the information storage device, wherein the second charging information corresponds to the identification information acquired by the first camera and corresponds to the temperature zone of external air when calculating the charging wait time.

5. The charging wait time calculation system according to claim 1, wherein,
each time charging of an electric vehicle is executed at a charging station, the information storage device is configured to store the first charging information acquired by the communication device, information on an area in which the charging is executed, and the identification information acquired by the second camera so that these information items are associated with one another, and
the information extraction device is configured to extract the second charging information from the stored charging information in the information storage device, wherein the second charging information corresponds to the identification information acquired by the first camera and corresponds to the area of the charging station as a fifth calculation object.

6. The charging wait time calculation system according to claim 1, wherein,
each time charging of an electric vehicle is executed at a charging station, the information storage device is configured to store the first charging information acquired by the communication device, information on an output of a charger, and the identification information acquired by the second camera so that these information items are associated with one another, and
the information extraction device is configured to extract the second charging information from the stored charging information in the information storage, wherein the second charging information corresponds to the identification information acquired by the first camera and corresponds to the output of the charger waiting for charging.

7. The charging wait time calculation system according to claim 1, wherein, each time charging of an electric vehicle is executed at a charging station, the information storage device is configured to store the first charging information acquired by the communication device, information on a rated capacity of a battery of the electric vehicle, and the identification information acquired by the second camera so that these information items are associated with one another, and when the second charging information corresponding to the identification information acquired by the second camera is not stored in the information storage, the information extraction device is configured to extract a third charging information of another electric vehicle from the stored charging information in the information storage device, wherein the third charging information of another electric vehicle corresponds to the rated capacity of the battery of the electric vehicle corresponding to the identification information acquired by the first camera.

8. The charging wait time calculation system according to claim 1, wherein each of the first and second cameras is configured to image a license plate of an electric vehicle, wherein the server further comprises:

an identification information storage device configured to store the identification information of the electric vehicle in association with a number of the license plate;

a number detector configured to detect the number of the license plate from imaging information of each of the first and second cameras; and an identification information extraction device configured to extract the identification information from the stored charging information in the identification information storage, wherein the identification information corresponds to the number detected by the number detector.

9. The charging wait time calculation system according to claim 1, wherein the identification information of an electric vehicle is acquired from the first and second cameras or from an ETC onboard device equipped in the electric vehicle.

10. A charging wait time calculation method comprising:

acquiring, by a communication device, charging information each time charging of a first electric vehicle is executed at a charging station, the charging information being information on a charged capacity or a time required for charging;

each time the charging of the first electric vehicle is executed at the charging station, acquiring identification information of the electric vehicle via a second camera;

storing the acquired charging information and the acquired identification information in an information storage device so that they are associated with each other;

acquiring, via a first camera, identification information of one or more second electric vehicles waiting for charging at the charging station as a first calculation object for which a charging wait time for the one or more second electric vehicles is calculated;

extracting, by an information extraction device, the charging information corresponding to the acquired identification information of the one or more second electric vehicles waiting for charging at the charging station as a second calculation object from the stored charging information in the information storage;

calculating, by a charging wait time calculator, the charging wait time at the charging station as a third calculation object on a basis of the extracted charging information; and transmitting, by the charging wait time calculator, the calculated charging wait time to a display panel disposed in the charging station, wherein the charging wait time calculator calculates a sum of a remaining charging time for the first electric vehicle being charged at the charging station as a fourth calculation object and each charging time for each of the one or more second electric vehicles waiting for charging at the charging station as a fifth calculation object.

11. The charging wait time calculation system of claim 1, wherein the server is independent of any onboard device of the first electric vehicle or any of the one or more second electric vehicles.

* * * * *